(No Model.)
N. PLYMPTON.
TEA POT.
No. 299,848. Patented June 3, 1884.
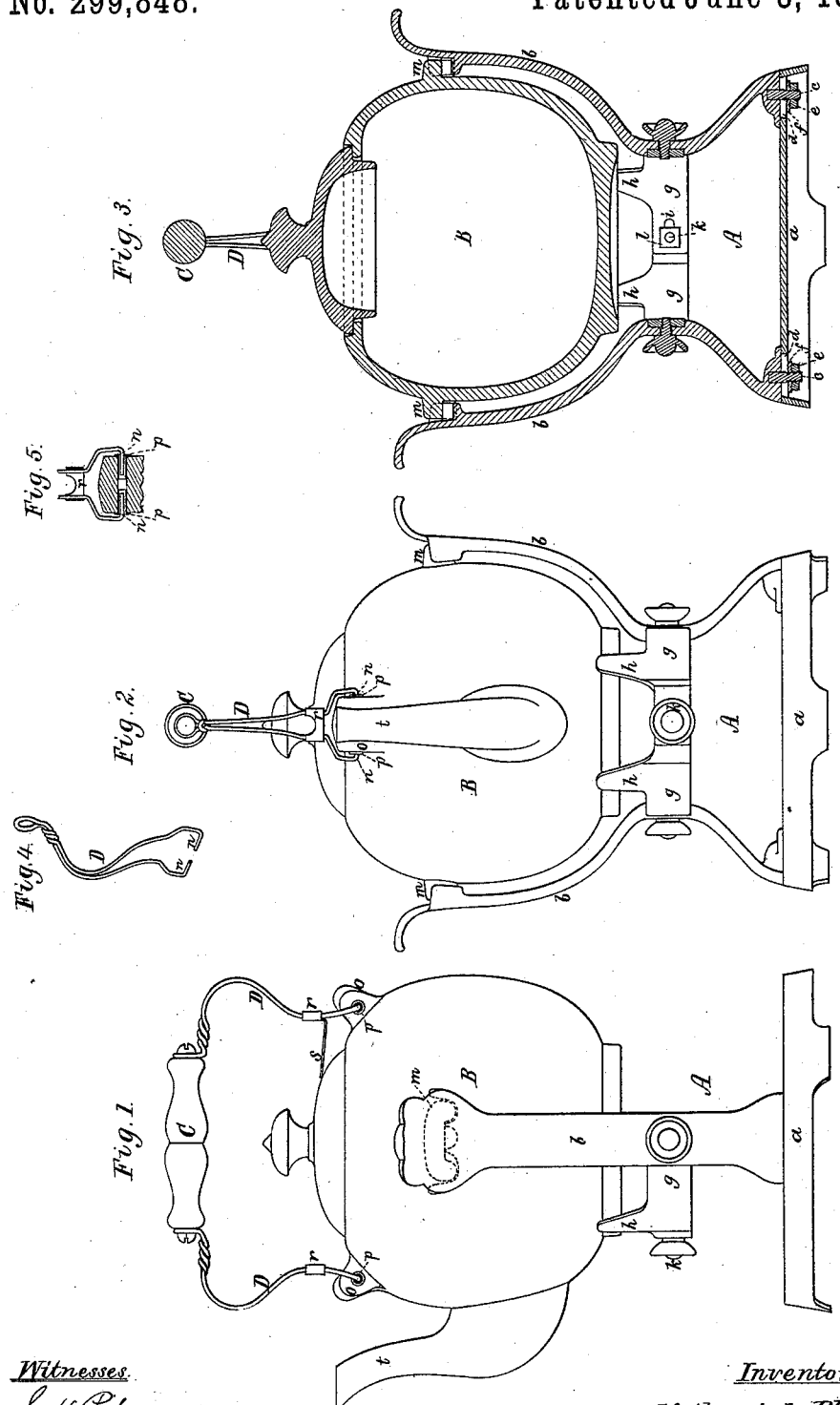
Witnesses
S. N. Piper
E. B. Pratt
Inventor
Nathaniel Plympton
by R. H. Eddy atty.

UNITED STATES PATENT OFFICE.

NATHANIEL PLYMPTON, OF BOSTON, MASSACHUSETTS.

TEA-POT.

SPECIFICATION forming part of Letters Patent No. 299,848, dated June 3, 1884.

Application filed November 26, 1883. (No model.)

*To all whom it may concern:*

Be it known that I, NATHANIEL PLYMPTON, of Boston, in the county of Suffolk, of the State of Massachusetts, have invented a new and useful Improvement in Tea-Pots; and I do hereby declare the same to be described in the following specification and represented in the accompanying drawings, of which—

Figure 1 is a side view, Fig. 2 a front elevation, and Fig. 3 a transverse section, of a tea-pot and its stand provided with my invention, the nature of which is defined in the claims hereinafter presented. Figs. 4 and 5 are hereinafter described.

My said invention relates to tea-pots having stands to support them, and to admit of their being tipped thereon, for the purpose of discharging a portion of their liquid contents into a cup or vessel; and my invention relates more especially to such tea-pots, having their bodies of crockery, china, or earthenware. The base of the stand usually supports a lamp placed on it concentrically to heat the tea-pots.

In the drawings, the tea-pot body is shown at B and its stand at A. The stand is composed of a circular base, $a$, and the two curved posts, $b$ $b$. These posts are adapted to the base, so as to be adjustable thereon nearer to or farther from each other. For this purpose there is at the foot of each post, a screw, $c$, which extends through a slot, $d$, made diametrically in the base, and has a nut, $e$, screwed upon it, a washer, $f$, first being placed on the screw. Furthermore, two curved arms, $g$ $g$, provided with short upward projections $h$ $h$, extend from the two posts and lap together near their inner ends. At the laps there is in one or each of the said arms a slit, $i$. A screw, $k$, is extended through such slit, and the two arms and a nut, $l$, serves with the nut to hold or bind the arms together, and with them to connect the two posts. The projections $h$ are stops to prevent the tea-pot body from being tilted backward. Near their upper ends the two posts have bearings, as usual, to sustain the ears $m$ $m$ of the tea-pot. By having the posts adjustable on the base and connected by the arms and their coupling-screw and nut, as described, the stand can be adapted to fit to tea-pots varying in size. In making the bodies of crockery or earthenware they will vary somewhat in size, and therefore to properly adapt the stand to such a body, in order for it to operate to advantage thereon, the stand is made with its posts adjustable, and provided with arms lapped on each other slotted in manner and screwed together by means as described.

The tea-pot handle is represented at C, it being screwed to and sustained by two curved wire standards, D D, each of which consists of a piece of wire bent at its middle and twisted together and otherwise bent in manner as represented in Fig. 4, which is a perspective view of it. At its two ends it is hooked, as shown at $n$ $n$, to enter the upper ears, $o$ $o$, of the tea-pot body, holes being made in the ears to receive eyelets $p$, into which the hooks of the standard are inserted. These eyelets, by being tapering, fit firmly in the holes and admit of the hooks fitting closely into them—the said eyelets. As the holes generally vary in size, the eyelets are used to produce a close fit of each of the handle-standards to the ear. Fig. 5 is a section through the ear and standard and the eyelets thereof. Each standard is held in connection with its ear by a clasp, $r$, bent or hooked around the two branches of the standard, the rear clasp having extended from it over and upon the cover, in manner as represented, a finger, $s$, or what is termed the "cover-guard," which, when the cover is in place in the mouth of the body, serves to keep the cover from falling out of or off the body, while the latter may be in the act of being tilted or turned down to discharge liquid from the nose $t$.

I do not herein claim a tea-pot or its stand having appliances as represented in the United States Patent No. 120,945, as such does not have posts applied to a base so as to be adjustable thereon, and provided not only with means of clamping them thereto, but with slotted and curved arms lapping on each other, and provided with means of clamping them to each other, as in my invention.

I claim—

1. The combination of the tea-pot, and the base with the posts adjustable on the latter, and provided with means for clamping them thereto, and with two slotted and curved arms lapping on each other, and having devices for clamping them together, all substantially as set forth.

2. The combination of the tea-pot and the base with the posts adjustable on the latter, and provided with means for clamping them thereto, and with two slotted and curved arms lapping on each other, and having devices for clamping them together, and stops, as described, for preventing the tea-pot and body from being tilted backward, all being substantially as represented.

3. The combination of the tea-pot body having perforated ears, as described, with the handle and its two hooked wire standards, the clasps applied thereto, and the guard projected from one of such clasps, all being substantially as set forth.

NATH. PLYMPTON.

Witnesses:
R. H. EDDY,
E. B. PRATT.